United States Patent [19]

Krause

[11] 4,430,302
[45] Feb. 7, 1984

[54] FLUIDIZED CATALYST REGENERATION APPARATUS

[75] Inventor: Bogdan J. Krause, Mt. Prospect, Ill.

[73] Assignee: UOP Inc., Des Plaines, Ill.

[21] Appl. No.: 367,495

[22] Filed: Apr. 12, 1982

[51] Int. Cl.$^3$ .............................................. B01J 8/24
[52] U.S. Cl. ..................................... 422/144; 422/49; 422/146; 422/200
[58] Field of Search ............... 422/49, 146, 144, 200

[56] References Cited

U.S. PATENT DOCUMENTS

| | | | |
|---|---|---|---|
| 2,431,630 | 11/1947 | Arveson | 252/242 |
| 2,458,435 | 1/1949 | Simpson | 252/418 |
| 2,494,337 | 1/1950 | Hemminger | 422/144 X |
| 2,596,299 | 5/1952 | Simpson | 422/200 |
| 2,926,143 | 2/1960 | Leland | 252/417 |
| 2,973,251 | 2/1961 | Sprague et al. | 422/146 |
| 2,995,426 | 8/1961 | Keith | 23/288 |
| 3,712,369 | 1/1973 | Berlin et al. | 422/146 X |
| 3,851,406 | 12/1974 | Dumitru et al. | 422/146 X |
| 4,243,634 | 1/1981 | Vickers | 422/144 |
| 4,251,484 | 2/1981 | Daviduk et al. | 422/49 X |
| 4,314,967 | 2/1982 | Kwon et al. | 422/49 |
| 4,353,812 | 10/1982 | Lomos et al. | 422/144 X |
| 4,359,448 | 11/1982 | Schuurman et al. | 422/49 X |

*Primary Examiner*—Barry S. Richman
*Attorney, Agent, or Firm*—James R. Hoatson, Jr.; John F. Spears, Jr.; William H. Page, II

[57] ABSTRACT

An apparatus suitable for use as the regenerator of a fluidized catalytic cracking process is disclosed. The apparatus is characterized by the novel heat removal system used to cool the internal volume of the apparatus. The heat removal system comprises banks of vertical hairpin-type cooling coils suspended through the sidewall of the vessel. The manifolds used to supply and remove coolant are located outside the vessel, with each manifold being separately controllable to allow the shutdown of individual banks of heat exchange coils.

4 Claims, 2 Drawing Figures

FLUIDIZED CATALYST REGENERATION APPARATUS

FIELD OF THE INVENTION

The invention relates to a design for an apparatus for the performance of a chemical reaction. More specifically the invention relates to an apparatus for performing a chemical reaction in the presence of a bed of fluidized particulate material, with the invention being particularly related to the indirect heat exchange means employed for removing heat from the internal volume of the apparatus when an exothermic reaction is performed within the apparatus. The invention is specifically directed to a catalyst regeneration vessel for use in a fluidized catalytic cracking process utilized in petroleum refineries for the catalytic cracking of petroleum fractions.

PRIOR ART

The use of fluidized beds of catalyst or other particulate materials such as refractory heat transfer particles is an old and established technology in the petroleum refining and petrochemical production arts. For instance, the use of fluidized catalytic cracking processes for converting petroleum distillates into lighter more volatile hydrocarbons is a widely practiced commercial operation which became established during World War II.

The use of heat transfer elements such as U-tube shaped heating coils within a fluidized reactor is also well known in the art. U.S. Pat. No. 2,995,426 issued to P. C. Keith illustrates such a heat removal design, with the heat exchangers being utilized to supply heat to the fluidized bed of particulate material. In this apparatus the manifold system which supplies and withdraws the heat exchange media is located within the main vessel of the reactor.

U.S. Pat. No. 2,458,435 issued to T. P. Simpson illustrates an apparatus for regenerating a moving bed of contact material wherein the heat exchange media is caused to pass through horizontal U-tubes which extend into the main vessel of the apparatus through a rather complex manifold system located outside of the reaction vessel.

U.S. Pat. No. 2,431,630 issued to M. H. Arbeson illustrates the use of heat exchange coils within the catalyst regeneration chamber of a fluidized catalytic cracking process. The coolant passes into an external manifold which distributes it to the various vertical heat exchange means located within the regeneration vessel and through which the coolant passes upward to a collection manifold located above the cooling coils.

U.S. Pat. No. 2,926,143 issued to M. B. Leland illustrates a rather complex cooling system for use within a catalyst regeneration vessel. The heat exchange coils are suspended from the coolant distribution and collection manifolds which are located within the regenerator vessel but which are linked together externally.

U.S. Pat. No. 4,243,634 issued to A. G. Vickers is pertinent for its illustration of the use of steam coils as heat removal apparatus within the catalyst regeneration zone of a modern fluidized catalytic cracking process.

BRIEF SUMMARY OF THE INVENTION

The invention provides a novel and very practical apparatus for performing exothermic catalytic reactions such as combustion in an enclosed vessel containing a fluidized bed of particulate material. It has several advantages over the prior art including the relative ease of retrofitting preexisting reactors with the subject heat removal system and the ability to isolate various parts of the total heat removal system in the event of substantial failure of individual heat exchange coils. The inventive concepts disclosed herein reside basically in the design of the heat removal system, and the other parts of the overall reaction vessel system may be similar to prior art components.

The apparatus may be characterized as comprising an enclosed reaction vessel having a substantially vertical sidewall; means to maintain a fluidized bed of catalyst within the reaction vessel and to transfer catalyst into and out of the reaction vessel; a first plurality of manifold systems located outside the reaction vessel, with each manifold system comprising separate and independent fluid delivery and fluid collection conduits; and an equal number second plurality of heat exchange means each of which comprises a plurality of looped heat exchange coils, with each heat exchange coil having two terminal portions which pass substantially horizontally through the sidewall of the reaction vessel and a central portion located below the terminal portions, with one terminal portion of each heat exchange coil communicating with a fluid delivery conduit and with the other terminal portion of the same heat exchange coil communicating with a fluid collection conduit of the same manifold system.

DETAILED DESCRIPTION

Figure 1:
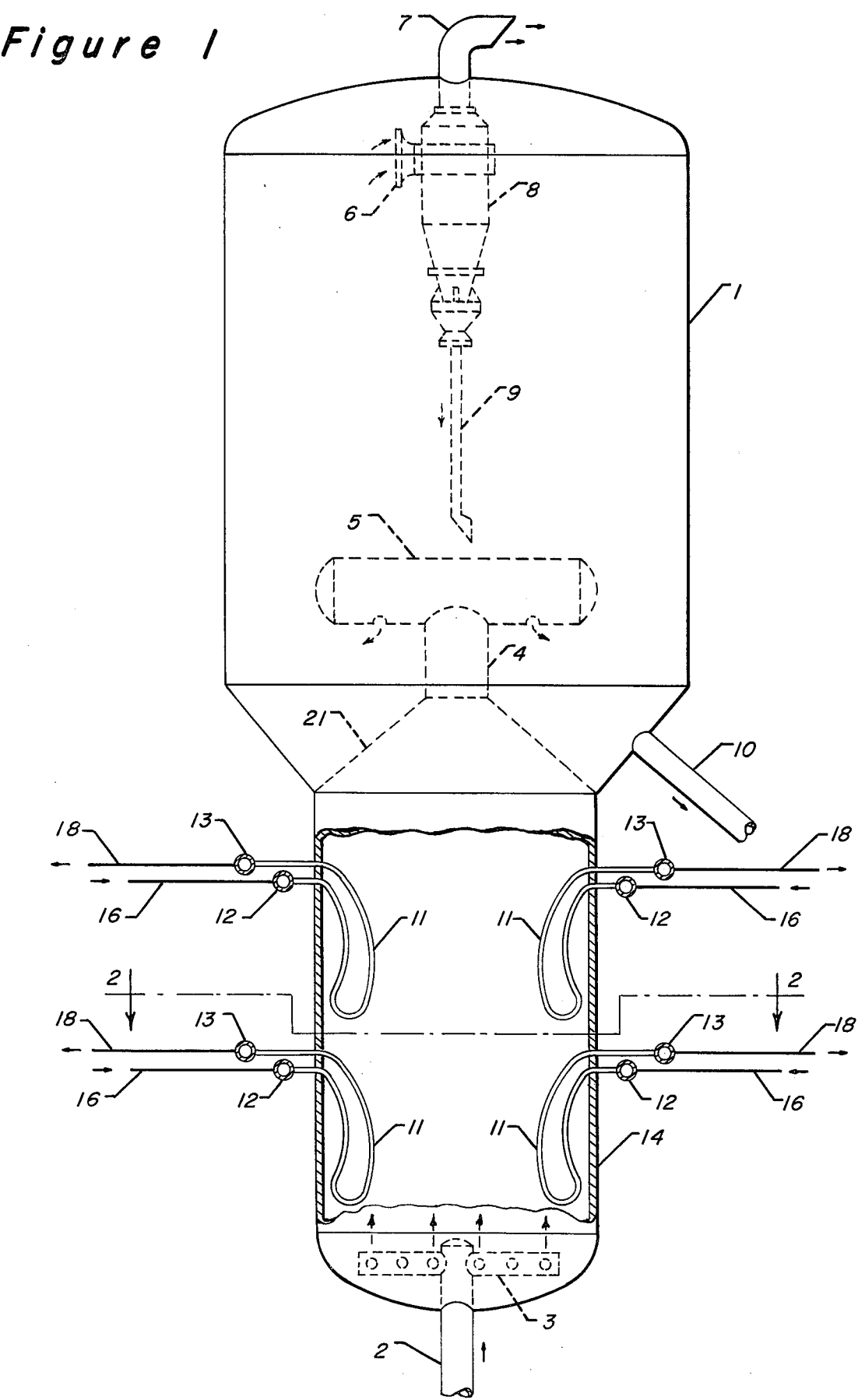
FIG. 1 is a partial cross sectional view taken on a vertical plane of the catalyst regeneration zone of a fluidized catalytic cracking unit which shows four separate banks or groupings of heat exchange coils 11 and four separate external manifolds comprising a water delivery conduit 12 and a steam removal conduit 13.

As previously mentioned, the use of fluidized beds of particulate material in high temperature reaction vessels is a well-established commercial practice. Many of the reactions performed in these reaction vessels are exothermic in nature to the extent that it is desirable to remove heat from the reaction vessel. In some processes such as the fluidized catalytic cracking (FCC) process described in further detail below, heat is removed from the apparatus by removing hot particulate matter and replacing the withdrawn particles with relatively cool particles. However, it is often necessary to remove an additional amount of heat by indirect heat exchange. This may be the case when the withdrawl rate of the particulate material is not sufficient to remove the heat generated by the exothermic reaction.

An increase in the amount of heat which will be liberated in an existing apparatus due to a change in processing conditions may also make it desirable to add or to supplement preexisting heat exchange removal devices. Perhaps the most common example of this is found in the present-day trend to the processing of heavier or residual feedstocks in FCC processes. This results in an increased buildup of carbonaceous deposits referred to as coke on the fluidized catalyst employed in the process. It is therefore necessary to oxidize an increased amount of carbonaceous compounds within the catalyst regeneration zone and an additional amount of heat is thereby liberated in the regeneration zone. If not removed, this heat may cause the temperature within the vessel to exceed the metallurgical temperature limits of the vessel. For this reason existing regeneration vessels are being retrofitted with improved or newly installed heat removal systems utilizing indirect heat exchange with a coolant medium such as water.

It is an objective of the subject invention to provide a reliable heat removal system for use in fluidized reactor systems. It is a specific objective of the subject invention to provide an indirect heat exchange system for removing heat from the catalyst regeneration zone of an FCC unit. It is a further objective of the subject invention to provide an apparatus design which facilitates the relatively quick and straight-forward installation of heat exchange coils in the existing regenerator of an FCC process.

An understanding of fluidized catalytic processes is beneficial in providing a background for an understanding of the usefulness and operation of the subject apparatus. Most major petroleum refineries contain a processing unit referred to as an FCC unit. The function of this unit is to break down high molecular weight hydrocarbons into smaller lower molecular weight hydrocarbons. An FCC unit is therefore used to upgrade heavy hydrocarbons to lighter hydrocarbons having a higher economic value. An FCC unit comprises a reaction zone and a catalyst regeneration zone. In the reaction zone, the feed stream is contacted with a finely divided fluidized catalyst maintained at elevated temperatures and a moderate positive pressure. This causes the conversion of the feed stream to more volatile product hydrocarbons, which are recovered from a vaporous stream withdrawn from the reaction zone, and the accumulation of carbonaceous deposits on the catalyst. These deposits lessen the catalytic effectiveness of the catalyst. To overcome this deactivation, a stream of used catalyst is continuously removed from the reaction zone and transferred into the catalyst regeneration zone of the FCC unit.

The stream of catalyst entering the regeneration zone joins a bed of fluidized catalyst retained within the regeneration zone and is contacted with pressurized air under a high temperature condition which results in the combustion of the carbonaceous deposits on the catalyst. This burning of the coke results in a reactivation or regeneration of the catalyst and also produces a very large amount of heat. The combustion products and the inert components of the oxygen supply stream charged to the regeneration zone are removed as a very high temperature gas stream referred to as the FCC flue gas stream. This stream may have a temperature of from about 1100° to 1400° F. and a pressure of about 25 to 60 psig, which is representative of typical conditions within the catalyst regeneration zone. The flue gas stream is normally removed through one or more cyclone-type particle separators located within the regeneration zone.

The preferred structure of the subject apparatus is illustrated in the drawing. The figures presented in the drawing have been simplified by the deletion of numerous small items such as control systems and minor internal structures such as supports, seals and various means to accommodate movement of the various parts of the apparatus due to temperature changes. This presentation of a rather detailed description of the preferred arrangement of the subject apparatus is not intended to preclude from the scope of the inventive concept those other embodiments set out herein or which are the result of expected modification of the preferred embodiment. Referring now to FIG. 1, a stream comprising air or oxygen-enriched air and FCC catalyst is passed upward through conduit 2 into the regeneration vessel 1 of the FCC unit. The entering stream of air and catalyst is distributed through a horizontal grid 3 or by other means across the bottom section of the lower portion of the regeneration vessel. The air rises upward through the regeneration vessel thereby maintaining a fluidized bed of catalyst in the lower portion of the regeneration vessel. This lower portion is separated from an upper portion of the regeneration vessel by an imperforate wall 21 having the shape of an open topped or truncated cone. The gaseous combustion products and residual components of the entering air are therefore channeled through a rather sizable circular conduit 4 affixed to the top of the imperforate wall 21. The rising gases and catalyst then divides into smaller streams and emerge from the openings along the bottom of the internal riser top piece 5, with the combined top piece and conduit 4 having a T-shaped appearance when viewed from the side.

The gaseous stream rising upward through the internal riser conduit 4 carries hot regenerated catalyst upward into the upper portion of the regeneration vessel. A very substantial amount of this catalyst falls to the lower level of the upper portion of the regeneration vessel and is gradually withdrawn through conduit 10 for passage into the reaction zone of the FCC unit. The combustion products and residual components of the air together with a small amount of entrained catalyst pass through the opening 6 into a cyclone-type separator 8. A very high percentage of the entrained catalyst particles is removed from the gas stream and returned to an intermediate level in the upper portion of the regeneration vessel through a conduit or dipleg 9. The hot regeneration zone flue gas stream is removed from the regeneration vessel through conduit 7, preferably for further removal of any entrained catalyst particles and for passage into a power recovery zone.

Heat is removed from the lower portion of the regeneration vessel by the generation of steam by indirect heat exchange. The design of the heat exchange system employed to accomplish this indirect heat exchange is the essence of the subject inventive concept. While it is very much preferred that water is utilized as the coolant, the subject apparatus is not limited to the use of any particular coolant fluid and may be employed with any practical heat exchange medium. The entering liquid-phase water or other coolant is separately supplied to each bank of heat exchange coils through a separate conduit 16 at a rate controlled by an upstream valve 20. This valve provides a means to independently control or terminate the flow of the coolant into each of the several banks of heat exchange coils mounted at various locations within the lower portion of the regeneration vessel. The water is distributed to several heat exchange coils through a multiport inlet or delivery conduit 12. Separate streams of water then pass horizontally through the sidewall of the reaction vessel and through each of the looped heat exchange coils 11 before emerging as steam or high temperature water which is then withdrawn in a substantially horizontal direction through the topmost portion of the heat exchange coil. The steam produced within the catalyst regeneration vessel is collected from each heat exchange coil of the individual banks or groups of heat exchange coils by passage into a separate outlet or fluid collection conduit 13 provided for each bank of heat exchange coils. The steam or hot water produced in several heat exchange coils is then withdrawn through line 18, with the heated products of all of the banks of heat exchangers preferably being admixed to form a high temperature product stream.

In viewing FIG. 1, it may be noted that separate heat exchange systems may be employed at different elevations within the same vessel, with there being no requirement that any or all of the heat exchange systems are located at the same elevation although it is preferred that the majority of the systems are installed in one or more horizontal rows of heat exchanger banks mounted at substantially the same elevation. The elevation and/or size of the independent heat exchange systems may be varied to accommodate vessel internals or openings such as manways. They may also be installed in any part of the entire reaction vessel including the upper portion of the regeneration vessel. FIG. 1 also illustrates the preferred sagging or drooping shape of the individual heat exchange coils 11. This shape results from the two lengths of each coil being curved along an arc having a centerpoint outside the vessel. As can be seen in the drawings, when coils are located at different elevations, the upper coils are positioned completely above those on a lower elevation. It is preferred that the two terminal portions of each heat exchange coil pass through the outer wall of the regeneration vessel in a substantially horizontal direction and that they then curve downward in a rather smooth arc. A semi-circular bottommost portion similar to most hairpin-type heat exchange coils is also preferred.

Figure 2:
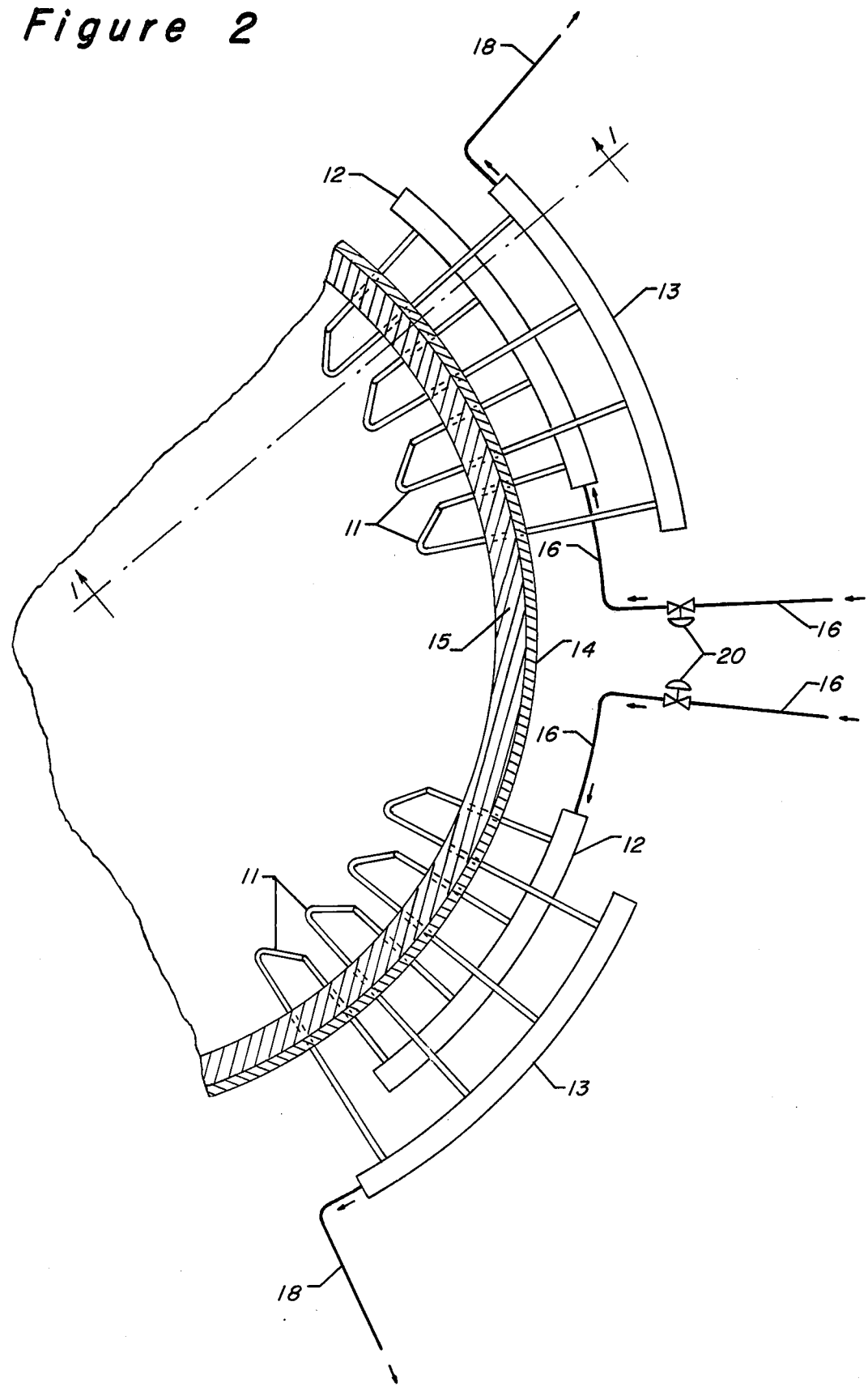
FIG. 2 is a cross sectional diagram taken on a horizontal plane looking downward at two complete separate banks of heat exchange coils 11.

FIG. 2 illustrates the view seen when looking downward at two adjacent banks or groupings of heat exchange coils. To simplify the preparation of FIG. 1, it was presumed that the plane of the cross section of FIG. 1 is taken at a point such that only the uppermost heat exchange coil of FIG. 2 is visible on FIG. 1. In FIG. 2, the vertical cylindrical outer wall 14 of the lower portion of the regeneration vessel 1 is illustrated in greater detail by showing the customary internal lining of a refractory insulation 15. This view provides a better representation of the preferred grouping of the individual heat exchange coils 11 into parallel groupings or banks, with each group of heat exchange coils being supplied with water through the lines 16 and discharging steam or heated water to the lines 18. The manifold system associated with each grouping of heat exchange coils comprises a lower fluid delivery conduit 12 and the upper fluid collection conduit 13, with each manifold system preferably servicing between from 3 to about 10 heat exchange coils. The conduits 12 and 13 are preferably curved to remain a uniform distance from the outer wall of the vessel, and are arranged with the outlet of fluid collection conduit being at a slightly higher elevation than the inlet or fluid delivery conduit.

The use of independent and separate manifold systems for each individual bank of heat exchange coils allows the flow of the coolant media into one or more banks of heat exchange coils to be restricted or terminated. This allows the shutdown of one bank of heat exchange coils if one or more of the coils suffers a catastrophic failure. This is a definite advantage over prior art apparatus which do not allow for this isolation and shutdown since it eliminates the possibility of the constant injection of the coolant media into the reaction vessel though ruptured heat exchange coils. The injection of the coolant media into the reaction vessel may have detrimental effects which can be quite significant. These detrimental effects can include a deactivation of the catalyst particles, an interference in the reaction being performed in the vessel or a substantial increase in the volume of vaporous material which must be removed from the reaction vessel to the extent that the facilities provided for this purpose may become overloaded and fail to operate at their optimum or designed specifications. Also, the release of a large quantity of liquid water into the vessel may generate enough steam to rupture the vessel.

To provide further isolation of the individual banks of heat exchange coils, it is preferred that a check valve not shown is installed in the outlet line 18 of each manifold system. This valve would be designed to prevent flow into the coils from the outlet line. A further and optional measure which may be employed to minimize the effects of the failure of individual heat exchange coils is the provision of a flow-limiting orifice or restriction in the inlet of each heat exchage coil to thereby limit the maximum amount of the coolant which may escape upon the total rupture or destruction of a portion of the heat exchange coil inside the regeneration vessel.

The subject apparatus may be advantageously employed in the modification of existing reaction vessels. In this instance, and also most probably in the case of new reaction apparatus, the individual manifold systems and their associated cooling coils are preassembled and are then installed as separate units into the already erected new or used outer vessel. In this prefabrication, a section of curved imperforate material suitable for installation as part of the outer wall of the vessel is provided as part of the prefabricated assembly. That is, the individual heat exchange coils are installed during prefabrication through a relatively small piece of this outer wall type material which conforms to the curvature of the outer vessel. To install the thus-assembled subassemblies in existing vessels a hole is cut in the wall of the vessel equal in size to the portion of the wall material used during the prefabrication, and the prefabricated assembly is then welded into place in this opening in the vessel wall. This simplifies the fabrication of the apparatus and shortens the time required to install the apparatus in the preexisting vessel, thereby possibly saving a significant amount of time during which it is required to remove the vessel from active service to perform the installation. The subject apparatus may therefore provide increased utilization of the apparatus and have significant cost benefits both in its initial installation and in its subsequent repair.

The apparatus may be constructed following established design and engineering practices now employed in the construction of apparatus used for similar purposes. In the specific case of an FCC regenerator each of the heat exchange coils is preferably formed from a single piece of type 304H seamless pipe. For the type of coils shown in the drawing the use of 1½ inch or 2 inch pipe in about 20 foot lengths is required. In one particular application the vertical distance between the bottom of the coil and the top of the upper section of the coil is about 7 feet 6 inches. The upper section of the coil is about 6½ inches above the lower section of the coil at the points these sections meet the vessel wall. The coils extend horizontally through the wall of the vessel and are connected to the wall of the vessel through an outward extending insulated nozzle. The coils are supported within the vessel at their upper ends, and are also mounted in a gridwork allowing limited vertical movement at a point about two-thirds of the length down the coil.

The heat exchange coils may have a shape other than that shown in the Drawing. However, it is preferred that at least two-thirds of the length of each heat exchange coil is located below the level of the manifold system with which the heat exchange coil is in communication. It is also preferred that the length of any horizontal sections of the coil is minimized to lessen erosion by fluidized particles. It is also preferred that the heat exchange coils are formed from plain surface tubing.

The manifold systems of the subject apparatus are totally located outside the outer vessel of the reaction zone. Each bank of heat exchange coils is in communication with a different manifold system, with the flow of coolant to each manifold being controlled by a separate flow control means. Each manifold comprises at least two separate (different) conduits, one to deliver the cold coolant media and one to remove heated coolant media. The operation of each fluid delivery conduit and fluid collection conduits is preferably carried on independently of the operation of every other conduit of the same type. Each of the conduits is preferably a distinct entity, which is united with the other conduits if at all only via communication with a common coolant source and a common coolant delivery point.

The invention may be characterized as a catalyst regeneration apparatus for a fluidized catalytic cracking process which comprises an enclosed reaction vessel having a substantially vertical sidewall; means to maintain a fluidized bed of catalyst within the reaction vessel and to add catalyst to and to remove catalyst from the reaction vessel; a plurality of manifold systems located outside the reaction vessel, with each manifold system comprising separate and independent fluid delivery and fluid collection conduits; and a plurality of heat exchange means each of which comprises a plurality of looped heat exchange coils, with each heat exchange coil having two terminal portions which pass substantially horizontally through said sidewall of the reaction vessel and a central portion located below the terminal portions, with one terminal portion of each heat exchange coil communicating with a fluid delivery conduit and with the other terminal portion of each heat exchange coil communicating with a fluid collection conduit of the same manifold system.

I claim as my invention:

1. An apparatus for performing a chemical reaction which comprises:
   (a) an enclosed reaction vessel having a substantially vertical sidewall;
   (b) means to maintain a fluidized bed of a particulate material within the reaction vessel;
   (c) a plurality of heat exchange fluid manifold systems located at different points outside the reaction vessel, with each manifold system comprising separate and independent fluid delivery and fluid collection conduits; and,
   (d) a plurality of heat exchange means located within said fluidized bed at different levels along said vertical sidewall having a length each of which comprises a plurality of U-shaped looped heat exchange coils, with each heat exchange coil having two terminal portions which pass through said sidewall of the reaction vessel, each of which has at least two-thirds of said length located below said terminal portions, with one terminal portion of each heat exchange coil communicating with a fluid delivery conduit and with the other terminal portion of each heat exchange coil communicating with a fluid collection conduit of the same manifold system and wherein the entire said length of at least some of said U-shaped coils is situated at a point above the uppermost portion of at least some of said coils.

2. The apparatus of claim 1 further characterized in that the two terminal portions of each heat exchange coil pass substantially horizontally through the vertical sidewall of the reaction vessel at the elevation of the corresponding manifold system.

3. A catalyst regeneration apparatus for a fluidized catalytic cracking process which comprises:
   (a) an enclosed reaction vessel having a substantially vertical sidewall;
   (b) means to maintain a fluidized bed of catalyst within the reaction vessel and to add catalyst to and to remove catalyst from the reaction vessel;
   (c) a plurality of heat exchange fluid manifold systems located outside the reaction vessel, with each manifold system comprising separate and independent fluid delivery and fluid collection conduits; and,
   (d) a plurality of heat exchange means located within said fluidized bed at different levels along said vertical sidewall each of which comprises a plurality of U-shaped looped heat exchange coils, with each heat exchange coil having two terminal portions which pass substantially horizontally through said sidewall of the reaction vessel and at least two-thirds of each of said heat exchange coil located below the terminal portions, with one terminal portion of each heat exchange coil communicating with a fluid delivery conduit and with the other terminal portion of each heat exchange coil communicating with a fluid collection conduit of the same manifold system and wherein the entire length of at least some of said U-shaped coils is situated at a point above the uppermost portion of at least some of said U-shaped coils.

4. The catalyst regeneration apparatus of claim 3 further characterized in that the apparatus also comprises a means to supply a separate and independently controllable supply of fluid coolant to each manifold system.

* * * * *